(12) United States Patent
Raynor

(10) Patent No.: US 8,456,513 B2
(45) Date of Patent: Jun. 4, 2013

(54) PANORAMIC CAMERA

(75) Inventor: Jeffrey Raynor, Edinburgh (GB)

(73) Assignee: STMicroelectronics (R&D) Ltd., Marlow Bucks (GB)

( * ) Notice: Subject to any disclaimer, the term of this patent is extended or adjusted under 35 U.S.C. 154(b) by 1560 days.

(21) Appl. No.: 11/752,506

(22) Filed: May 23, 2007

(65) Prior Publication Data

US 2007/0285562 A1    Dec. 13, 2007

(30) Foreign Application Priority Data

May 24, 2006  (EP) .................................. 06252702

(51) Int. Cl.
*G02B 17/00*    (2006.01)

(52) U.S. Cl.
USPC ............... 348/38; 348/36; 348/37; 348/39

(58) Field of Classification Search
USPC .......... 345/725; 348/36, 37, 28, 39; 359/725; 396/427
See application file for complete search history.

(56) References Cited

U.S. PATENT DOCUMENTS

| | | | |
|---|---|---|---|
| 5,903,782 A | 5/1999 | Oxaal | 396/50 |
| 6,639,625 B1 | 10/2003 | Ishida et al. | 348/218.1 |
| 2005/0041094 A1* | 2/2005 | Gal et al. | 348/36 |
| 2006/0055912 A1 | 3/2006 | Kurth | 356/28 |
| 2006/0164733 A1* | 7/2006 | Gal et al. | 359/725 |
| 2007/0126700 A1* | 6/2007 | Wright | 345/161 |
| 2007/0217782 A1* | 9/2007 | McCutchen et al. | 396/427 |

FOREIGN PATENT DOCUMENTS

| | | |
|---|---|---|
| WO | 99/51027 | 10/1999 |
| WO | 2004/004320 | 1/2004 |

* cited by examiner

*Primary Examiner* — Quang N Nguyen
(74) *Attorney, Agent, or Firm* — Allen, Dyer, Soppelt, Milbrath & Gilchrist, P.A.

(57) ABSTRACT

A camera is mounted in a sphere-shaped housing. The housing can be rotated within a base that permits the camera to take multiple images covering a panoramic view. Motion of the housing within the base is detected by motion sensors that provide positional information for allowing the images to be stitched together. The motion sensors are optical mice sensors. Processing circuitry and a power supply may be located within the housing.

25 Claims, 3 Drawing Sheets

PANORAMIC CAMERA

FIELD OF THE INVENTION

The invention relates to an electronic camera capable of taking panoramic photographs. The term "panoramic photograph" is used herein to denote a photograph having a very wide field of view such as a 180° horizontal strip, or a hemisphere of 360° of azimuth and 180° of elevation.

BACKGROUND OF THE INVENTION

Panoramic cameras have been known for many years. Panoramic film cameras have been realized using mechanical movements. In one form, a camera is rotated on a turntable with the film being moved in synchronization. In another form, the lens and film are moved in opposite directions. Such cameras are expensive, cumbersome and difficult to use, and have had only limited use by specialist photographers.

In recent years the availability of digital electronic cameras has led to increased interest in panoramic cameras. Most digital still cameras are bundled with panoramic software, and there are many commercial applications. One such application is in real estate where a virtual copy of a property can be made available on the Internet for prospective purchasers to view.

One technique uses a conventional high-performance digital still camera and a special tripod/turntable for accurate motion of the camera. This system helps to provide smooth and accurate motion of the camera but still requires complex set-up, a high-resolution digital still camera, and careful usage to ensure that the problems of stitching multiple images are minimized. One example of this technique is SpinImageDV as disclosed in the web site www.spinimagedv.com.

There are also known systems which use a single shot technique. One example by Kaidan is disclosed in the web site www.kaidan.com and uses a specially shaped reflector to image a whole room onto a flat surface, or directly onto the image plane of a digital camera. This avoids the complication of stitching multiple images together, but the imaging technique compresses spatial information. Therefore, the resolution of the final image is degraded. Also, the special reflector and the mechanics required to mount this accurately with respect to the camera add to cost and complexity.

A further method is to use a lens or lenses with 180° field of view. Such lenses are very complex and difficult to manufacture, and are thus expensive.

SUMMARY OF THE INVENTION

In view of the foregoing background, an object of the present invention is to provide a wide field-of-view panoramic camera using inexpensive optics, mechanics and electronics.

This and other objects, advantages and features in accordance with the present invention are provided by a panoramic camera comprising a camera housing having an exterior shape which comprises a surface which is rotationally symmetrical around at least one axis, and a base having a cavity in which the camera housing is received. The cavity may have a shape cooperating with that of the camera housing so that the camera housing may be rotated within the cavity about the at least one axis.

An image capture device may be mounted in the camera housing and view the exterior along an optical axis. Motion sensor means or a motion sensor may be mounted on the camera housing and/or the base for detecting relative rotary motion between the camera housing and the base. Signal transmission means or a signal transmitter may communicate image data and motion sensor data to processing means or a processor.

The camera housing may be spherical and the cavity may be part-spherical, but other cooperating shapes are also possible. The motion sensor means may comprise a plurality of mouse sensors, such as covenantal optical mouse sensors. The mouse sensors may be mounted in the camera housing, but could alternatively be mounted in the base.

The base cavity may be a half sphere, and there may be four mouse sensors. Image processing circuitry may be located within the camera housing. The signal transmission means may be internal to the camera housing. Alternatively, the signal transmission means may comprise wireless signal transmission means for transmitting camera and motion detection signals to a remote processor.

The camera may include indicator means or an indicator for indicating to a user when all of the desired scene has been imaged. The camera housing may be manually movable within the base, or motor means or a motor may be used for moving the camera housing within the base.

BRIEF DESCRIPTION OF THE DRAWINGS

An embodiment of the invention will now be described, by way of example only, with reference to the drawings, in which.

DETAILED DESCRIPTION OF THE PREFERRED EMBODIMENTS

Figure 1:
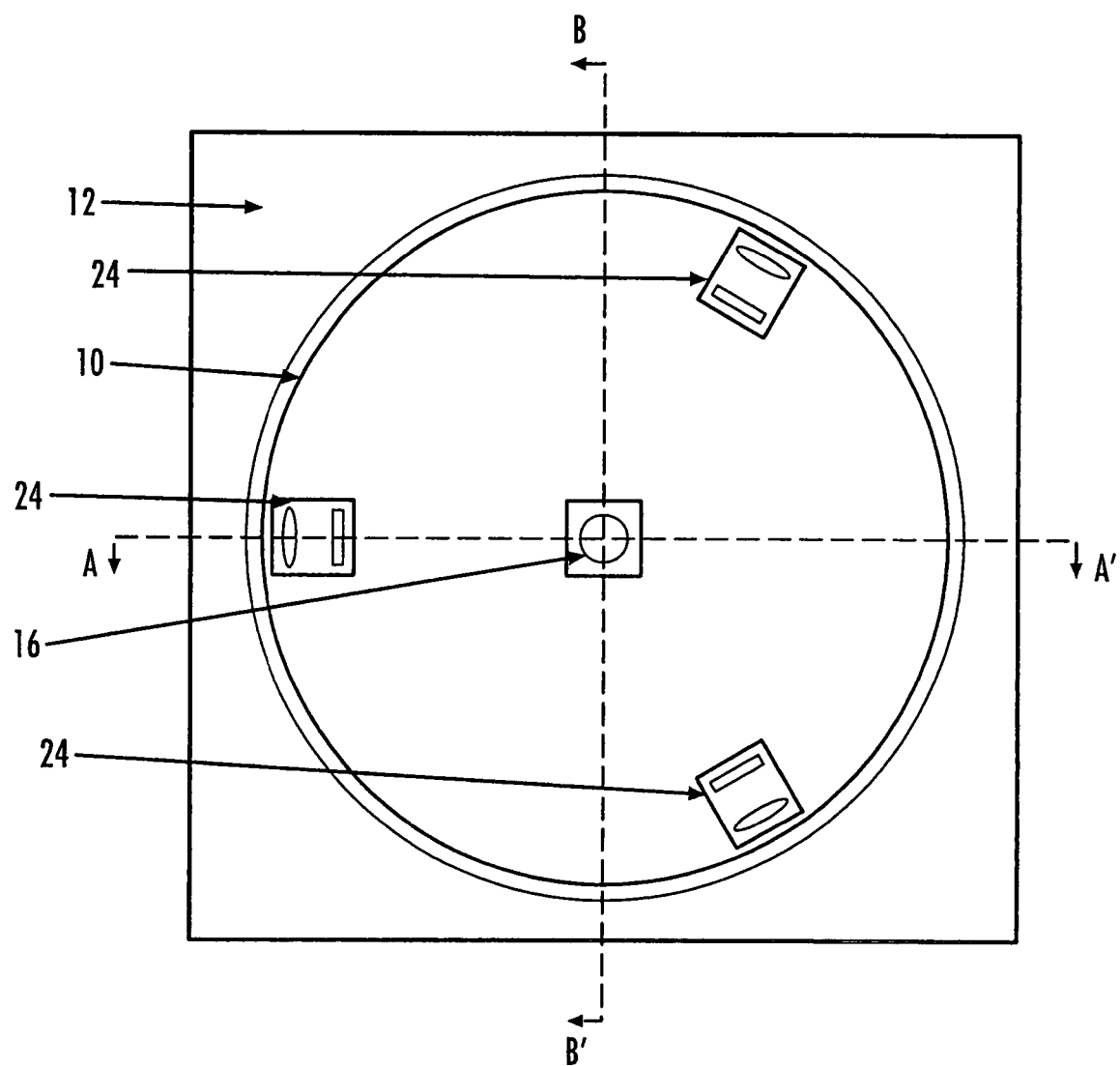
FIG. 1 is a schematic plan view of one embodiment of a camera according to the present invention.
Figure 2:
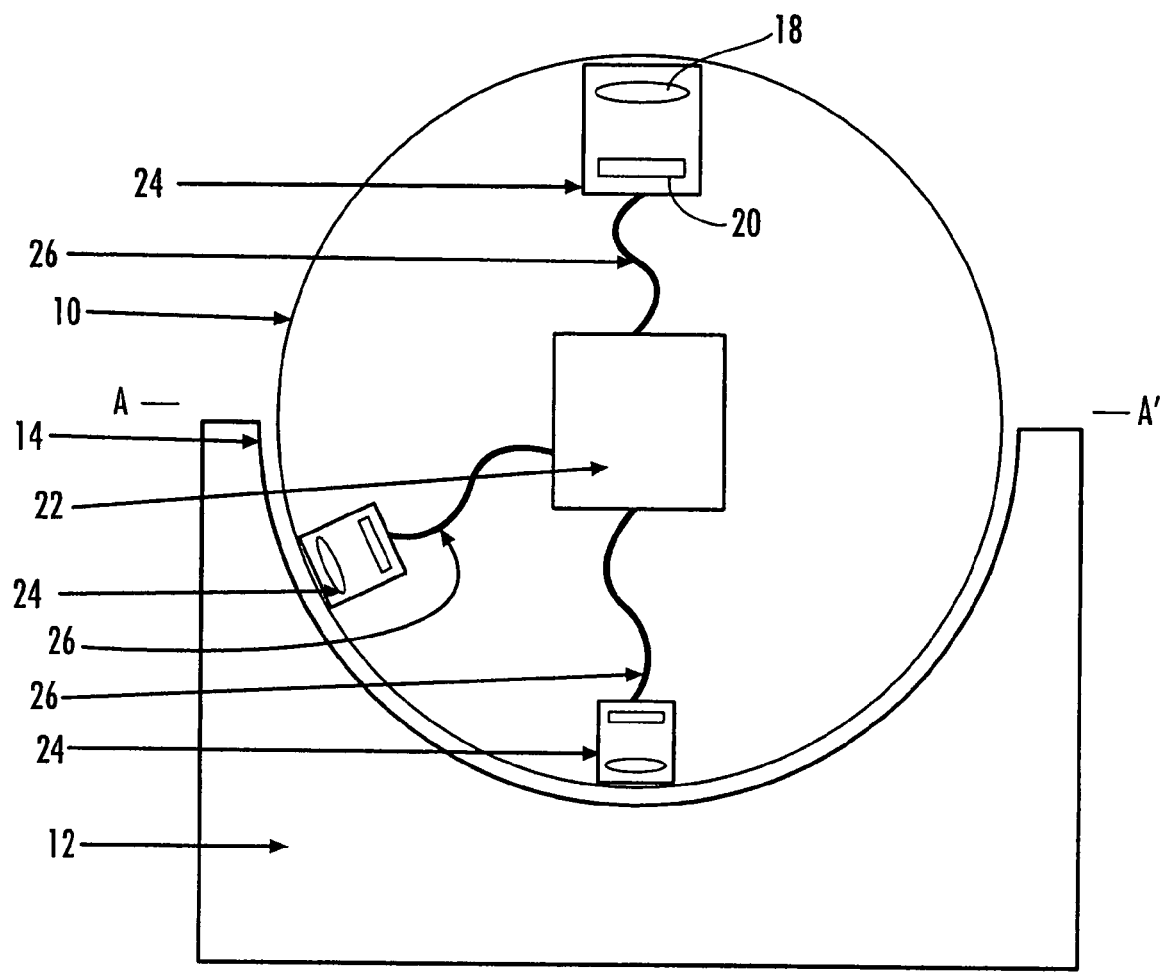
FIG. 2 is a cross-sectional end view taken on line A-A' of FIG. 1.
Figure 3:
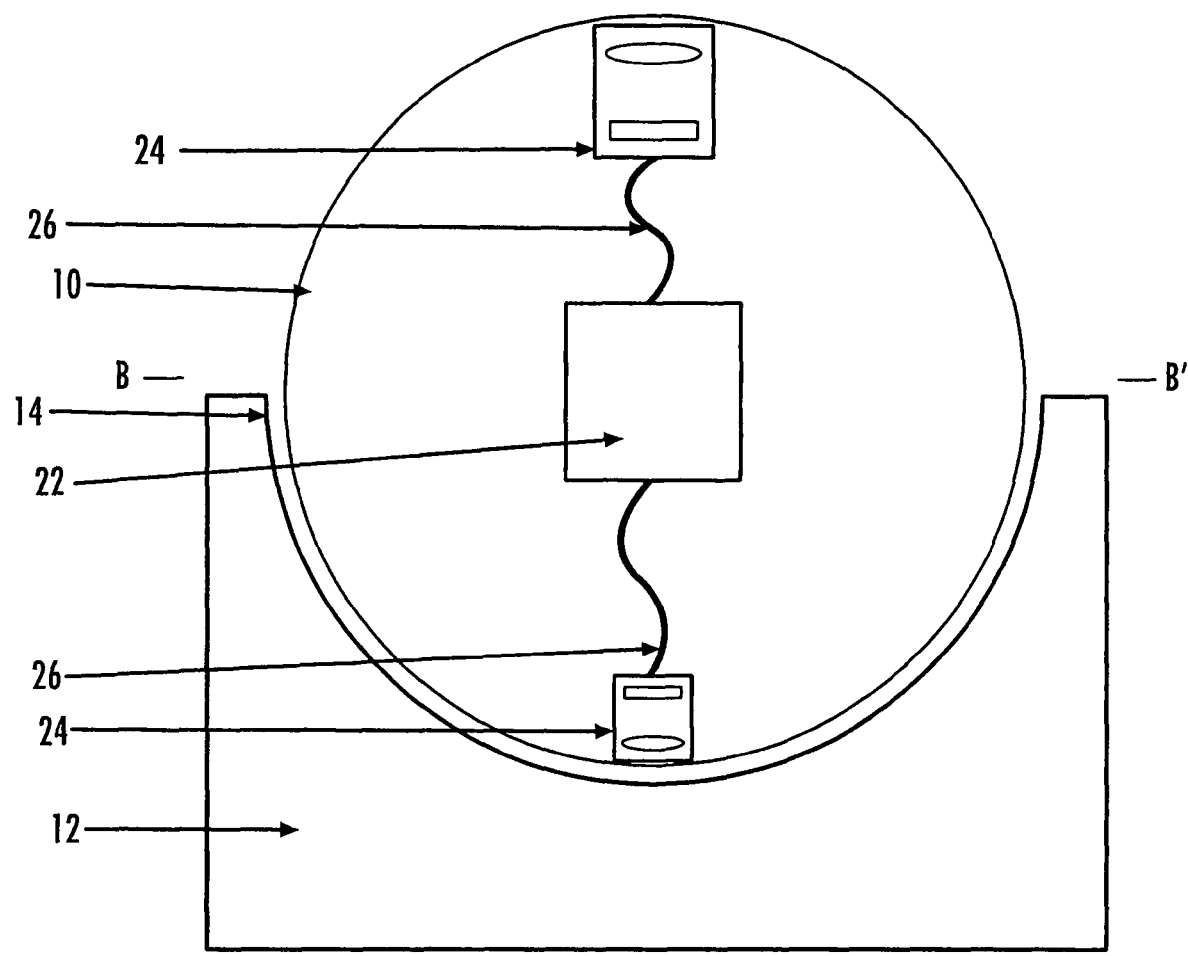
FIG. 3 is a cross-sectional side view taken on line B-B' of FIG. 1.

The camera comprises a sphere 10 and a base 12. The base 12 has a hemispherical cavity 14 which has a slightly larger diameter than that of the sphere 10. This arrangement allows the sphere 10 to be rotated within the base 12 by hand.

An imaging sensor 16 is mounted adjacent the surface of the sphere 10. As schematically shown in the drawings, the imaging sensor comprises a lens 18 and an image capture device 20, which may suitably be a single-chip digital camera. The lens 18 may be a single-element plastic lens, or may be a more sophisticated lens system such as a single- or multi-element glass lens. The image capture device 20 may suitably be a relatively low-resolution 2-D image sensor, such as a CIF 352×288 pixel sensor or a VGA 640×480 pixel sensor.

The sphere 10 also houses an electronics package 22 which contains processing circuitry and a battery to power the camera. The package 22 is preferably situated at the center of the sphere 10 to assist in rotational balancing of the sphere 10. The processing circuitry may conveniently be provided in the form of a general purpose microprocessor, suitably programmed.

The sphere 10 is provided with four motion sensors 24. The motion sensors 24 in this example are positioned in the hemisphere opposite to that in which the imaging sensor 16 is located. Specifically, taking the imaging sensor 16 as located at the North pole, the motion sensors 24 are located with one at the South pole and the other three at 30° South and at longitudes of 0°, 120° East and 120° West.

The motion sensors 24 are most suitably motion sensors as used in optical mice which are manufactured in large quantities, and are thus readily available at low cost. As is well known, such sensors give output signals representing relative X-Y motion between the sensor and a surface over which it passes. The positioning of the sensors 24 described above is chosen such that, for motion of the imaging sensor 16 through an entire hemisphere, there will always be a minimum of two motion sensors within the cavity 14. This is to avoid the situation of a single sensor being within the cavity, and the sphere 10 rotated about an axis passing through the sensor.

The motion sensors 24 provide output signals to the electronics package 22 by transmission paths 26, which could conveniently be USB, PS2, I2C, SPI, or wireless links.

To image a volume of space, the base 12 is placed on a surface and the sphere 10 is placed in the cavity 14 with the imaging sensor 16 unobscured by the base. The sphere 10 is rotated by hand around the vertical and the two horizontal axes until the whole of the scene has been imaged.

As the sphere 10 is rotated, the output from the imaging sensor 16 is captured by the microprocessor, along with the data from the motion sensors 24. Optical mice sensors have great accuracy (20 counts per mm is typical) and can operate at high speed (in excess of 100 mm per second). This enables the sphere 10 to be rotated at relatively high speed, e.g., a 100 mm sphere could be rotated through 360° in approximately 3 seconds.

As the sphere 10 is rotated, the motion sensors 24 observe the surface of the cavity 14 and calculate the direction of motion. Optical mouse sensors are designed to operate on a flat surface and output X/Y coordinates of motion across this surface. In this application, as the motion is spherical it is convenient to use spherical polar coordinates using angles of rotation around three mutually orthogonal axes. As a single mouse sensor outputs only two sets of information, a minimum of two sensors must image the cavity 14 at any given time. Optimally these are disposed at 90° with respect to the center of the sphere. If they were at 180° they would form an axis, and in the event of rotation about this axis there would be no output from the sensors. The preferred locations for the sensors are as detailed above.

As the sphere 10 is rotated, there will be positions in which one or more of the motion sensors 24 will not be observing the base 12 and their motion must be disregarded. Fortunately, optical mice sensors incorporate techniques to inhibit the output if they are not observing a useful surface. This can be used in the present embodiment to ignore from the stitching algorithm any mouse sensor not producing an output.

As the sphere 10 is rotated, the imaging sensor 16 acquires a series of image frames. The directional information from the motion sensors 24 allows the relative alignments of the frames to be calculated, and the images can be stitched together using readily available software.

The processing system may operate in real time to stitch the images together. In this case, the system can provide feedback to an operator (e.g., in the form of an audible bleep or a visual signal LED) that the whole scene has been successfully captured.

A lower cost system could merely store the image information along with the motion sensors' output for later processing. A medium cost system would not process and stitch the images in real time, but analyze the data from the motion sensors and provide feedback to the user once the whole scene has been captured.

Modifications may be made to the foregoing embodiment within the scope of the invention. The camera sphere could be moved by motors rather than by hand. For example, this may be done by motors mounted in the base and driving the sphere through contact wheels.

The motion sensors, instead of being mounted on the sphere, could be mounted on the base, facing the sphere. In this case it would suffice to use three motion sensors, or even two motion sensors provided they are not aligned with each other.

As noted above, the optical mouse type of motion sensor is preferred for simplicity and low cost. However, in principle any suitable form of motion sensor may be used, for example contact-wheel type mouse sensors.

The camera can be arranged to image more than a hemisphere. For example, if it is desired to image below the horizontal equatorial plane, the base may be reduced to less than a hemisphere. There has to be sufficient part-sphere to sphere contact to retain the sphere in place and allow easy manipulation, and additional motion sensors may be required.

The invention is also applicable to cameras imaging smaller, but still panoramic views. For example, it may be desired to image a restricted vertical angle over an azimuth of 360° or less, say in the form of a panoramic group photograph. This requirement could be met by a combination of a camera housing and base other than spherical/part-spherical, such as a cylindrical camera housing having its lower end rotating within a cylindrical base cavity.

The processing electronics may be located outside the camera sphere and receive image and motion sensor signals by wireless transfer. This could conveniently be done by a commercially available system such as Bluetooth or WiFi. In this case, the processing could be carried out on a suitably programmed PC or PDA.

The invention thus enables the provision of a panoramic camera which is straightforward, easily portable and economic to manufacture. The use of readily available components such as mouse sensors and lower resolution image sensors, and the fact that the physical components such as the sphere and base can be easily made by techniques such as injection molding of plastics, leads to low costs. Its straightforward mechanical construction means that it is easily installed, which is important for such applications as real estate viewing, and light weight for greater portability.

That which is claimed:

1. A panoramic camera comprising:
   a camera housing having an exterior shape that is rotationally symmetrical around at least one axis;
   a base having a cavity receiving said camera housing so that said camera housing can be rotated within the cavity about the at least one axis;
   an image capture device mounted in said camera housing and configured to generate image frames along an optical axis;
   at least one motion sensor configured to provide motion sensor data for detecting relative rotary motion between said camera housing and said base; and
   a processor configured to align the image frames based upon the motion sensor data.

2. The camera of claim 1, wherein the exterior shape of said camera housing is spherical, and the cavity in said base corresponds to the spherical shape of said camera housing.

3. The camera of claim 1, wherein said at least one motion sensor comprises a plurality of mouse sensors.

4. The camera of claim 3, wherein said plurality of mouse sensors is mounted in said camera housing.

5. The camera of claim 3, wherein the cavity in said base is shaped as a half sphere, and said plurality of mouse sensors comprises four mouse sensors.

6. The camera of claim 3, wherein each mouse sensor comprises an optical mouse sensor.

7. The camera of claim 1, wherein said processor is configured to stitch together the image frames for providing a panoramic image.

8. The camera of claim 1, further comprising an indicator for indicating when a panoramic scene has been imaged.

9. The camera of claim 1, wherein said camera housing is configured to manually moved within the cavity of said base.

10. The camera of claim 1, further comprising a motor configured to move said camera housing within the cavity of said base.

11. A panoramic camera comprising:
a camera housing having an exterior shape that is rotationally symmetrical around at least one axis;
a base having a cavity receiving said camera housing so that said camera housing can be rotated within the cavity about the at least one axis;
an image capture device mounted in said camera housing and configured to generate image frames along an optical axis;
at least one motion sensor configured to provide motion sensor data for detecting relative rotary motion between said camera housing and said base to be used for aligning the image frames; and
a signal transmitter for transmitting the image frames and the motion sensor data to an external processor.

12. The camera of claim 11, wherein the exterior shape of said camera housing is spherical, and the cavity in said base corresponds to the spherical shape of said camera housing.

13. The camera of claim 11, wherein said at least one motion sensor comprises a plurality of optical mouse sensors.

14. The camera of claim 13, wherein said plurality of optical mouse sensors is mounted in said camera housing.

15. The camera of claim 13, wherein the cavity in said base is shaped as a half sphere, and said plurality of mouse sensors comprises four mouse sensors.

16. The camera of claim 11, wherein said signal transmitter is configured to wirelessly transmit the image frames and the motion sensor data; and wherein the external processor is configured to align the image frames based upon the motion sensor data for stitching together the received image frames for providing a panoramic image.

17. The camera of claim 11, further comprising an indicator for indicating when a panoramic scene has been imaged.

18. The camera of claim 11, further comprising a motor configured to move said camera housing within the cavity of said base.

19. A method for providing a panoramic image using a panoramic camera comprising:
rotating a camera housing with respect to a base having a cavity for receiving the camera housing, the camera housing having an exterior shape so that the rotating is symmetrical around at least one axis;
providing image frames along an optical axis using an image capture device mounted in the camera housing;
providing motion sensor data using at least one motion sensor for detecting relative rotary motion between the camera housing and the base; and
processing the motion sensor data to align the image frames for providing the panoramic mage.

20. The method of claim 19, wherein the exterior shape of the camera housing is spherical, and the cavity in the base corresponds to the spherical shape of the camera housing.

21. The method of claim 19, wherein the at least one motion sensor comprises a plurality of optical mouse sensors; and wherein the plurality of optical mouse sensors is mounted in the camera housing.

22. The method of claim 21, wherein the cavity in the base is shaped as a half sphere, and the plurality of mouse sensors comprises four mouse sensors.

23. The method of claim 19, wherein the processor stitches together the image frames for providing the panoramic image.

24. The method of claim 19, wherein the panoramic camera further comprises an indicator for indicating when a panoramic scene has been imaged.

25. The method of claim 19, wherein the panoramic camera further comprises a motor for moving the camera housing within the cavity of the base.

* * * * *